United States Patent
Yamamoto

(10) Patent No.: US 8,494,395 B2
(45) Date of Patent: Jul. 23, 2013

(54) POWER SUPPLY UNIT, IMAGE FORMING APPARATUS AND POWER SUPPLY CONTROL METHOD

(75) Inventor: Naohiro Yamamoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 288 days.

(21) Appl. No.: 12/953,929

(22) Filed: Nov. 24, 2010

(65) Prior Publication Data
US 2011/0135338 A1 Jun. 9, 2011

(30) Foreign Application Priority Data
Dec. 9, 2009 (JP) ................................. 2009-279408

(51) Int. Cl.
*G03G 15/00* (2006.01)

(52) U.S. Cl.
USPC ................................ 399/88; 399/168; 399/37

(58) Field of Classification Search
USPC ............................................. 399/37, 88, 168
See application file for complete search history.

(56) References Cited

U.S. PATENT DOCUMENTS

| | | | | |
|---|---|---|---|---|
| 4,359,753 | A | * | 11/1982 | Marshall ........................ 347/112 |
| 5,998,977 | A | * | 12/1999 | Hsu et al. ...................... 323/272 |
| 2004/0105692 | A1 | * | 6/2004 | Tamiya et al. .................. 399/66 |
| 2007/0273941 | A1 | | 11/2007 | Ito |
| 2010/0129102 | A1 | * | 5/2010 | Fujihara et al. ................. 399/55 |

FOREIGN PATENT DOCUMENTS

| | | |
|---|---|---|
| CN | 101078896 A | 11/2007 |
| JP | 05-076103 | 3/1993 |
| JP | 3632428 | 3/2005 |

OTHER PUBLICATIONS

Chinese Office Action dated Mar. 13, 2013.

* cited by examiner

*Primary Examiner* — Walter L Lindsay, Jr.
*Assistant Examiner* — Roy Y Yi
(74) *Attorney, Agent, or Firm* — IPUSA, PLLC

(57) ABSTRACT

A power supply unit includes a switching circuit that drives a switching device by a duty ratio corresponding to a target voltage output value and outputs an alternating current signal; a coupling capacitance element provided in a subsequent stage with respect to the switching circuit; a voltage transformation unit that increases a voltage of the alternating current signal input by using the switching circuit, and outputs a high-voltage alternating current voltage to an electrifying unit; a charging unit that charges the coupling capacitance element in response to a power supply voltage being turned on; and a control unit that controls driving of the switching device to cause the coupling capacitance element to be charged to a predetermined charged amount before the switching circuit starts outputting the alternating current signal.

13 Claims, 6 Drawing Sheets

POWER SUPPLY UNIT, IMAGE FORMING APPARATUS AND POWER SUPPLY CONTROL METHOD

BACKGROUND OF THE INVENTION

1. Field of the Invention

The present invention relates to a power supply unit of an electrifying unit used in an image forming process according to an electrophotographic method, and, in detail, to a power supply unit in which an erroneous output to the electrifying unit is mitigated, an image forming apparatus including the power supply unit, and a power supply control method that the power supply unit carries out.

2. Description of the Related Art

In the related art, in an image forming process of a roller electrifying method according to the electrophotographic method, an AC-DC superposing method in which an alternating current voltage is superposed on a direct current voltage is suitably used in order to achieve a uniform electrifying voltage on a surface of a roller of an electrifying unit. Further, recently, in order to achieve high amplifying efficiency, a class D amplifier is used instead of an analog amplifier (see Japanese Patent No. 3632428: patent document 1). A class D amplifier is employed also in an alternating current high-voltage power supply unit used for supplying a high-voltage alternating current bias to the electrifying unit. Thereby, amplifying efficiency improves, a heat generation amount is reduced, then power consumption of an image forming apparatus is reduced, and further, it is possible to avoid having a heat radiation plate that is necessary for the amplifier in a case of the analog amplifier.

However, in the alternating current high-voltage power supply unit employing the class D amplifier in the related art, an erroneous output may occur when the class D amplifier is used the first time immediately after a power supply voltage is turned on in a drive circuit of the alternating current high-voltage power supply unit. If the erroneous output has occurred, a discharge may occur in an electrifying unit depending on a magnitude of the erroneous output, a discharge history may remain on a photosensitive member, and thus, a color band or a white band may occur in an image formed by an image forming apparatus that employs the alternating current high-voltage power supply unit and the electrifying unit.

SUMMARY OF THE INVENTION

According to embodiments of the present invention, a power supply unit includes a switching circuit that drives a switching device at a duty ratio corresponding to a target voltage output value and outputs an alternating current signal; a coupling capacitance element provided in a subsequent stage with respect to the switching circuit; a voltage transformation unit that increases a voltage of the alternating current signal input by using the switching circuit, and outputs high-voltage alternating current voltage to an electrifying unit; a charging unit that charges the coupling capacitance element in response to a power supply voltage being turned on; and a control unit that controls driving of the switching device to cause the coupling capacitance element to be charged to a predetermined charge amount before the switching circuit starts outputting the alternating current signal.

Other objects, features and advantages of the present invention will become more apparent from the following detailed description when read in conjunction with the accompanying drawings.

DETAILED DESCRIPTION OF THE EMBODIMENTS

Figure 1A:
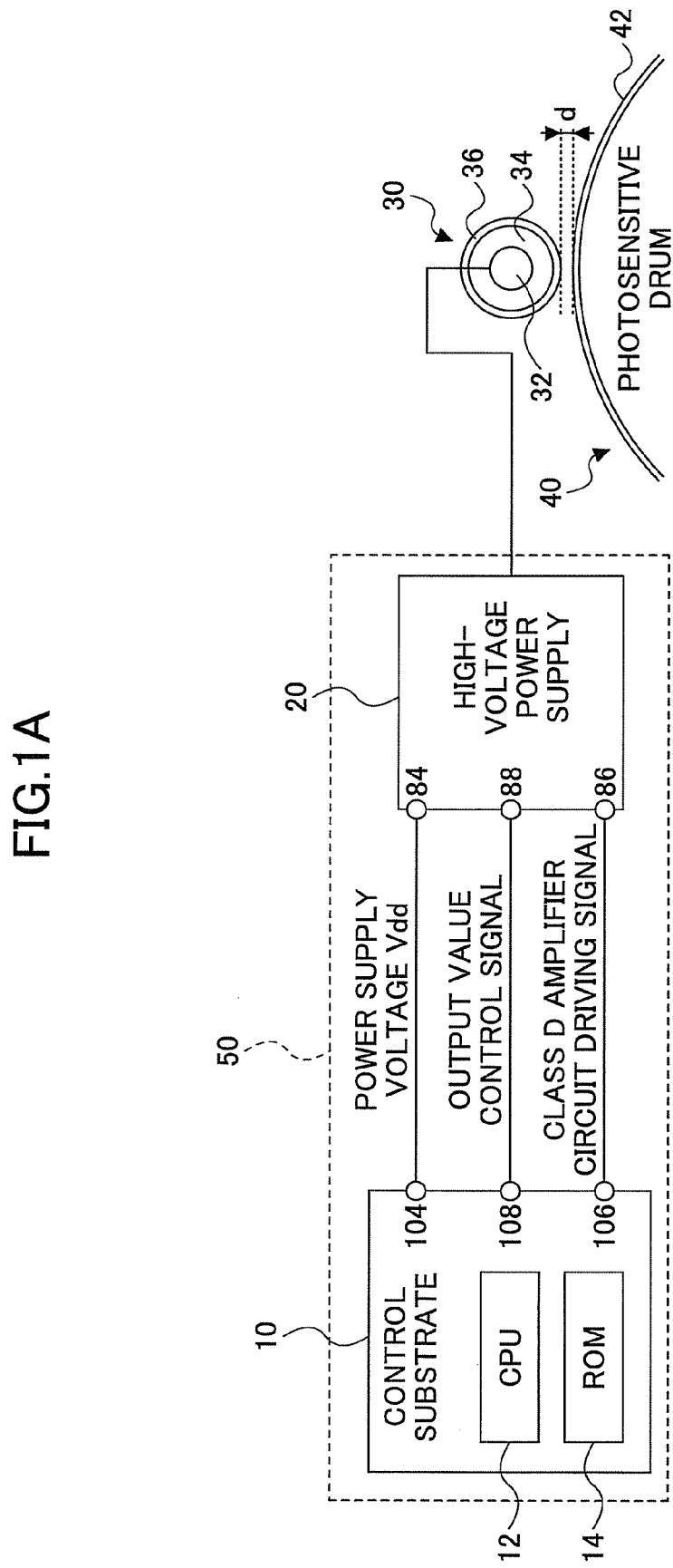
FIG. 1A diagrammatically shows a hardware configuration concerning high-voltage power supply control in a laser printer according an embodiment of the present invention.

By studying a cause of the above-mentioned erroneous output of the alternating current high-voltage power supply unit in the related art, it has been found out that, when the class D amplifier is driven, an inrush current flows in an AC coupling capacitor that is connected to a primary side of a voltage transformer, and the erroneous output occurs because the inrush current flows in the voltage transformer.

As to an inrush current of a capacitor, for example, Japanese Laid-Open Patent Application No. 5-76103 (patent document 2) discloses that a rectifier is connected parallel to a filter capacitor, and the filter capacitor connected to an inverter in parallel via the rectifier is previously charged by using a relatively low-voltage alternating current power supply unit of a control circuit. Thereby, an excessive inrush current in the filter capacitor otherwise occurring after starting up is inhibited. The related art of patent document 2 is for the purpose of simplifying a circuit configuration on the side of a high-voltage main circuit.

However, the related art of patent document 2 is to inhibit an excessive inrush current in the filter capacitor by previously charging the filter capacitor that is inserted parallel to the inverter as mentioned above. Therefore, if it is attempted to apply the related art of patent document 2 to an image forming apparatus, it is not possible to mitigate the erroneous output of the alternating current high-voltage power supply unit. This is because the circuit configurations are different from one another between the related art of patent document 2 and the alternating current high-voltage power supply unit of the image forming apparatus. Further, the related art of patent document 2 employs the separate power supply unit to charge the filter capacitor, and therefore, an extra power supply unit is required if it is attempted to apply the related art of patent document 2 to the image forming apparatus.

Further, if it is attempted to previously charge the AC coupling capacitor connected to the primary side of the voltage transformer, there is no disclosure in the related art by which it can be guaranteed to achieve sufficient charging to such a degree that an image formed before the class D amplifier is started up is prevented from being degraded. Rather, in the related art, charging still may not be sufficient, so that it may not be possible to inhibit the inrush current below an allowable value. Further, power consumption occurs even in a case of 0-volt output in the class D amplifier, and therefore, although the operation of the class D amplifier is stopped in the case of 0-volt output, performance of printing in the image forming apparatus may be adversely affected if an excessively sufficient time for charging is ensured.

Therefore, in the related art, development of a capability has been demanded by which the erroneous output of the alternating current high-voltage power supply unit employing the class D amplifier can be mitigated with a minimum necessary waiting time, and image degradation in an image forming process can be suitably avoided.

An embodiment of the present invention has been devised in consideration of the above-described related art, and an object of the embodiment is to provide a power supply unit, an image forming apparatus employing the power supply unit and a power supply control method that is realized in the power supply unit, by which the erroneous output of the alternating current high-voltage power supply unit employing the class D amplifier can be reduced, and image degradation in an image forming process using an electrifying unit according to an electrophotographic method or such can be suitably avoided, while the performance of image forming processing can be maintained.

In the embodiment, in order to achieve the above-mentioned object, a power supply unit is provided, which includes a switching circuit that drives a switching device at a duty ratio corresponding to a target voltage output value and outputs an alternating current signal; and a charging unit that charges, in response to a power supply voltage being turned on, a coupling capacitance element which is provided between the switching circuit and a voltage transformation unit that increases a voltage of the alternating current signal input by using the switching circuit and outputs high-voltage alternating current voltage to an electrifying unit. The power supply unit further includes a control unit that controls driving of the switching device to cause the coupling capacitance element to be charged to a predetermined charged amount before the switching circuit starts outputting the alternating current signal. It is noted that the charging to the predetermined charged amount means a state in which a voltage applied to the coupling capacitance element has reached within an allowable voltage deviation range. The coupling capacitance element is an element that cuts off a direct current component of the transmitted alternating current signal, and then outputs the alternating current signal to the voltage transformation unit.

Further, in the embodiment, the control unit may start driving of the switching device after a time corresponding to device time constant has elapsed from when charging of the coupling capacitance element is started in response to the power supply voltage being turned on. The time corresponding to the device time constant may be obtained from an electrical capacitance of the coupling capacitance element and resistance values of resistance elements included in the charging unit. Further, the time corresponding to the device time constant may be a charging time required until the voltage applied to the coupling capacitance element has reached within the allowable voltage deviation range, or a time obtained from a margin corresponding to a tolerance of the electrical capacitance of the coupling capacitance element being added to the charging time.

Further, in the embodiment, the control unit may obtain a time (the time corresponding to the device time constant) required for a magnitude of an erroneous output depending on a charged state of the coupling capacitance element becoming equal to or less than a breakdown voltage according to Paschen's rule. The magnitude of the erroneous output corresponds to a product obtained from a voltage difference between a voltage applied to the coupling capacitance element which is reached until immediately before driving of the switching device is started and a voltage applied to the coupling capacitance element at a time of zero output being multiplied by a voltage transformation ratio of the voltage transformation unit. Further, in the embodiment, a time (the time corresponding to the device time constant) required for the magnitude of the erroneous output depends on the charged state of the coupling capacitance element becoming equal to or less than the breakdown voltage according to Paschen's rule corresponding to atmospheric pressure. These optimum times may be previously calculated and stored in a storage device. Further, tolerances of components/parts of the high-voltage power supply unit may be determined in such a manner to control the erroneous output to be equal to or less than the breakdown voltage calculated according to Paschen's rule.

Further, in the embodiment, the resistance values of the resistance elements included in the charging unit may be a combination of resistance values corresponding to a duty ratio for a case where a target voltage output value is zero. The coupling capacitance element is charged by a voltage obtained from the power supply voltage being divided by a ratio corresponding to the resistance values of the resistance elements included in the charging unit. Further, in the embodiment, the resistance values of the resistance elements and the electrical capacitance of the coupling capacitance element may be set to be values corresponding to a time interval from a time of the power supply voltage being turned on to a time of driving of the switching device being started. Further, the charging unit may include a first resistance element connected between a terminal supplying the power supply voltage and one end of the coupling capacitance element and a second resistance element connected between the end of the coupling capacitance element and a ground point.

Further, in the embodiment, the switching circuit may include a high-side switching device that controls conduction to the power supply voltage; a low-side switching device that controls conduction to a ground potential; a high-side drive circuit that drives the high-side switching device; a low-side drive circuit that drives the low-side switching device; and an output control circuit that controls the high-side drive circuit and the low-side drive circuit. Further, the switching circuit may include a lowpass filter that is connected to the output sides of the high-side switching device and the low-side switching device, and the coupling capacitance element is provided in a subsequent stage with respect to the lowpass filter.

Further, in the embodiment, an image forming apparatus is provided, which includes the power supply unit having the above-described features, and the electrifying unit that receives the high-voltage alternating current voltage supplied by the power supply unit. Further, in the embodiment, a power supply control method is provided which is realized in the power supply unit. The power supply control method includes the steps of the charging unit charging the coupling capacitance element in response to the power supply voltage being turned on; the control unit controlling the switching circuit to cause the coupling capacitance element to be charged to the predetermined charged amount before the switching circuit starts outputting the alternating current signal; the switching circuit driving the switching device at the duty ratio corresponding to the target voltage output value and outputting the alternating current signal; and the voltage transformation unit increasing the alternating current signal that is input by using the coupling capacitance element and outputting the high-voltage alternating current voltage to the electrifying unit.

According to the above-described configurations in the embodiment, the coupling capacitance element is charged to the predetermined charged amount by the charging unit previously before power supply to a part driving the switching device is started and the switching circuit starts output. Therefore, an inrush current to the voltage transformation unit can be mitigated, an erroneous output of a high-voltage electrifying output can be prevented and further, degradation in image quality otherwise caused by the erroneous output can be suitably avoided. Further, a timing at which the power supply to the part driving the switching device is started is determined in consideration of such a charged level of the coupling capacitance element to avoid degradation in image quality. Therefore, it is possible to minimize degradation in performance of printing.

Below, the embodiment of the present invention will be described in detail. However, the embodiment of the present invention is not limited to the embodiment described below. In the embodiment described below, a laser printer is used as an example of the image forming apparatus including the power supply unit.

FIG. 1A diagrammatically shows a hardware configuration concerning high-voltage power supply control in the laser printer in the embodiment. The hardware configuration shown in FIG. 1A includes a power supply unit 50 that includes a control substrate 10 and a high-voltage power supply unit 20, and an electrifying unit 30. The high-voltage power supply unit 20 supplies a high-voltage electrifying output to the electrifying unit 30 that is provided in a printer engine of the laser printer which carries out an image forming process in the electrophotographic method.

Figure 1B:
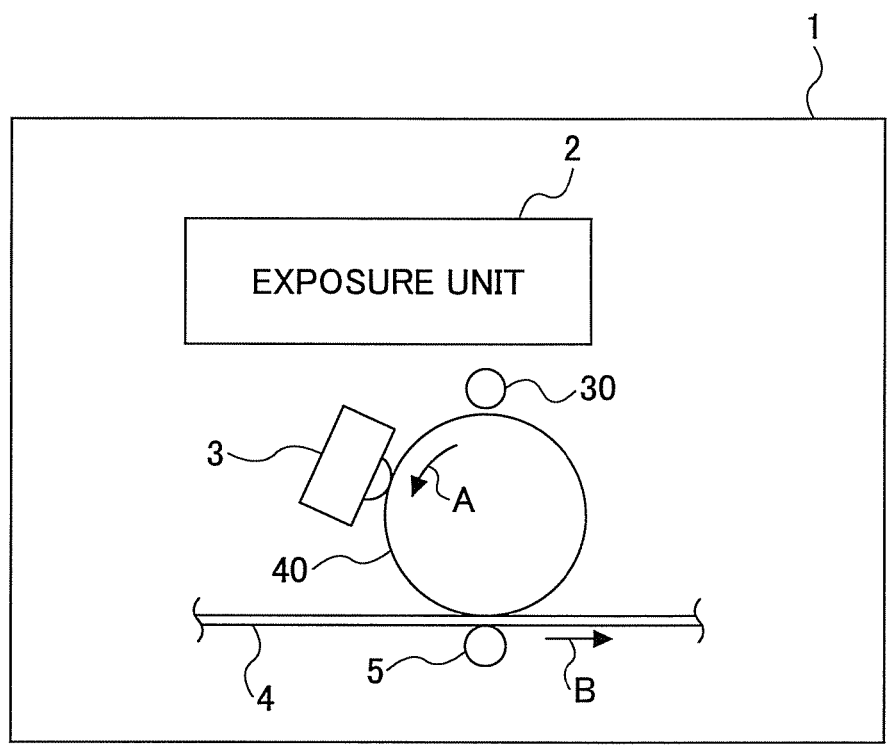
FIG. 1B diagrammatically shows a hardware configuration of the laser printer.

FIG. 1B diagrammatically shows a hardware configuration of the laser printer 1 in the embodiment. As shown in FIG. 1B, the laser printer 1 includes an exposure unit 2, a photosensitive drum 40 that is rotated in a direction indicated by an arrow A in FIG. 1B, the electrifying unit 30, a development unit 3, a transfer belt 4 that is moved in a direction indicted by an arrow B, and a transfer roller 5. In this configuration, after the electrifying unit 30 uniformly electrifies the photosensitive drum 40, the exposure unit 2 uses laser light modulated by a given image data signal to expose a circumferential surface the photosensitive drum 40 to form an electrostatic latent image on the circumferential surface of the photosensitive drum 40. The development unit 30 then visualizes the electrostatic latent image with toner to form a toner image, and the toner image is then transferred from the photosensitive drum 40 to paper conveyed by the transfer belt 4 by a function the transfer roller 5. This image forming process is a well-known electrophotographic method, and therefore, description of the process in further detail will be omitted. Further, in FIG. 1B, for the sake of convenience, other parts/components of the laser printer including the power supply unit 50 are omitted.

The control substrate 10 receives power from a main power source (not shown) and supplies a power supply voltage to the high-voltage power supply unit 20. Further, the control substrate 10 is connected to the high-voltage power supply unit 20 by using various signal lines that include a class D amplifier circuit driving signal line and an output value control signal line described below, and controls operation of the high-voltage power supply unit 20. FIG. 1A shows, as connecting lines between the control substrate 10 and the high-voltage power supply unit 20, a power supply voltage supply line ("power supply voltage Vdd") that supplies the power supply voltage to the high-voltage power supply unit 20; the output value control signal line ("output value control signal") that transmits an output value such as a target voltage output value; and the class D amplifier circuit driving signal line ("class D amplifier circuit driving signal") for controlling a switching circuit (class D amplifier circuit) 92 (see FIG. 2) included in the high-voltage power supply unit 20.

The control substrate 10 transmits, by using the output value control signal line, a signal designating a voltage value and a frequency value of an electrifying alternating current output, and controls characteristics of the electrifying alternating current output that is output by the high-voltage power supply unit 20. It is noted that, in FIG. 1A, the output value control signal line is indicated by a single solid line. However, it is not necessary to be limited, and, the voltage value and frequency value of the electrifying alternating current output may be transmitted by using separate signal lines. Further, the control substrate 10 uses the class D amplifier circuit driving signal line and transmits a signal that controls stopping and starting of driving of the class D amplifier circuit in the high-voltage power supply unit 20, and controls operation of the class D amplifier circuit in the high-voltage power supply unit 20. The class D amplifier circuit in the high-voltage power supply circuit 20 consumes regular power even while the high-voltage output voltage supplied by the class D amplifier circuit is 0 volts (referred to as a time of zero output, hereinafter). Therefore, generally speaking, at the time of zero output, operation of the class D amplifier circuit is for a while stopped by using the class D amplifier circuit driving signal line and power consumption is thus reduced.

The high-voltage power supply unit 20 has a probability to generate an erroneous output depending on an internal configuration thereof. However, if the erroneous output occurs, an excessive voltage is applied to the electrifying unit 30 that receives the erroneous output. Then, if the excessive voltage more than a breakdown voltage is applied to the electrifying unit 30, a discharge history may remain on an electrifying surface (circumferential surface) of the photosensitive drum 40. The electrifying unit 30 shown in FIG. 1A has a form of an electrifying roller that includes a shaft metal 32, a conduction layer 34, a surface layer 36 and a gap roller not shown, and is disposed in proximity to an electrifying surface 42 of the photosensitive drum 40 in a non-contact manner. A gap having a predetermined distance "d" is provided at a nip part between the electrifying unit 30 and the photosensitive drum 40 (see FIG. 1A). The electrifying unit 30 receives the high-voltage electrifying output voltage from the high-voltage power supply unit 20, and homogenously electrifies the photosensitive drum 40 in a manner of proximity discharge. Generally speaking, the breakdown voltage at which discharge starts in the electrifying unit 30 of the non-contact type is a function of the distance "d" of the gap and an atmospheric pressure "p" according to Paschen's rule. If the erroneous output exceeds the breakdown voltage, image quality may be degraded.

In the embodiment, in order to mitigate the erroneous output, although details will be described later, the control substrate 10 controls a timing to start driving of the class D amplifier circuit in the high-voltage power supply unit 20 by using the class D amplifier circuit driving signal line. Thereby, the control substrate 10 mitigates the erroneous output. At this time, preferably, the timing to start driving the class D amplifier circuit may be determined to correspond to the above-mentioned breakdown voltage according to Paschen's rule.

The control substrate 10 in the embodiment includes a CPU (central processing unit) 12 that generates the various control signals such as the above-mentioned class D amplifier circuit driving signal and so forth; and a ROM (read only memory) 14 that stores various setting values, a control program and so forth. The control substrate 10 controls the timing to start driving of the class D amplifier circuit in the high-voltage power supply unit 20, and so forth. The control substrate 10 realizes high-voltage power supply control, described later, by reading the control program, the various setting values and so forth from the ROM 14 and loads the control program, the various setting values and so forth in a memory (not shown) that provides a work area of the CPU 12.

Figure 2:
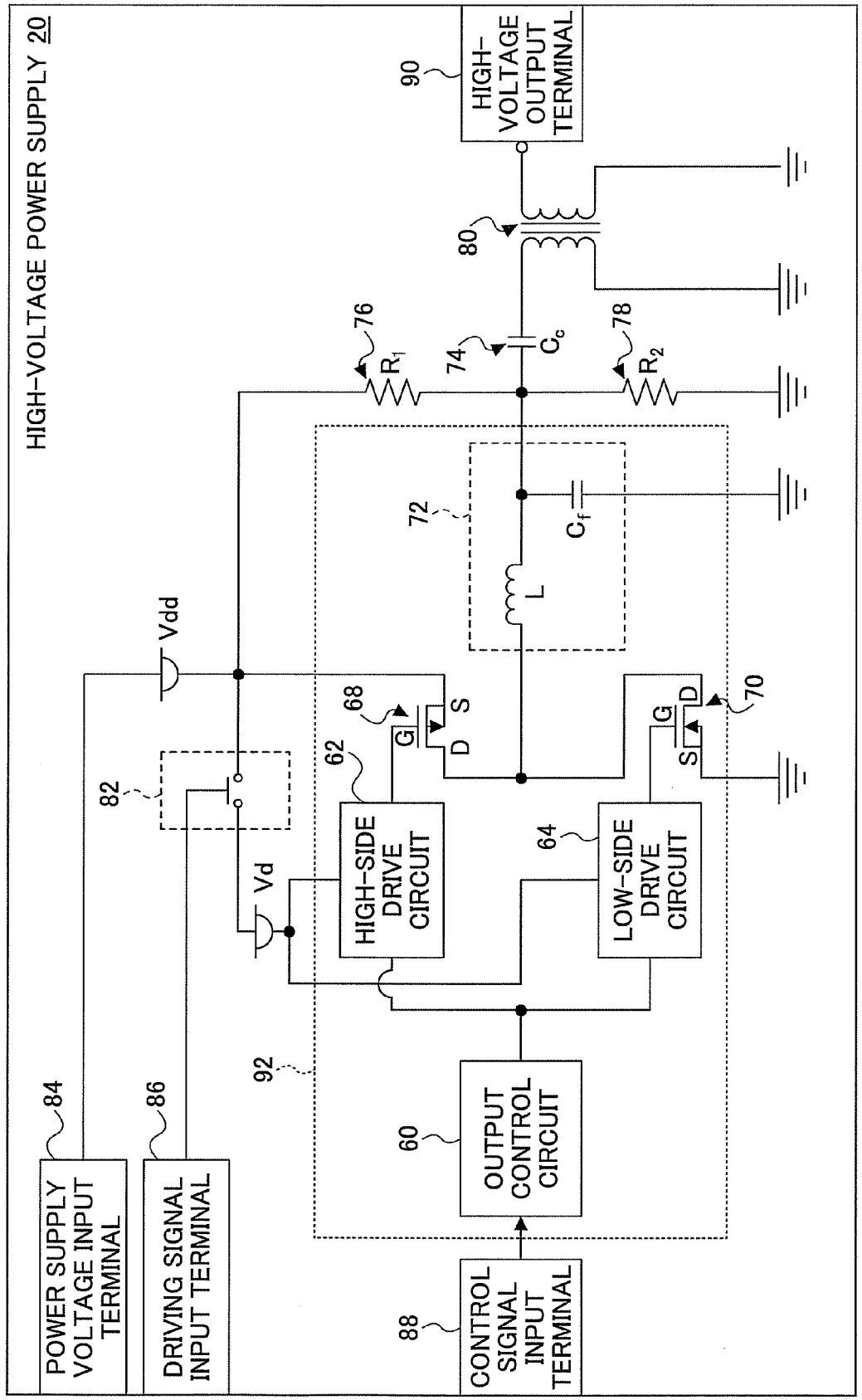
FIG. 2 shows a circuit diagram of a circuit configuration in the high voltage power supply unit in the embodiment.

Below, with reference to FIGS. 2 through 5, details of the high-voltage power supply control that mitigates the erroneous output of the high-voltage power supply unit 20 will be described. FIG. 2 shows a circuit diagram showing a circuit configuration of the high-voltage power supply unit 20 in the embodiment. As shown in FIG. 2, the high-voltage power supply unit 20 in the embodiment includes an output control circuit 60, a high-side drive circuit 62, a low-side drive circuit 64, a high-side transistor 68 and a low-side transistor 70. Thus, the high-voltage power supply unit 20 is a high-voltage power supply circuit in a class D amplifier method.

The high-voltage power supply unit 20 further includes a control signal input terminal 88 to which the output value control signal line from the control substrate 10 is connected, and therefrom inputs the control signal that designates the voltage value and frequency value of the electrifying alternating current output voltage from the control substrate 10 to the output control circuit 60. According to the input control signal, the output control circuit 60 operates the high-side and low-side drive circuits 62 and 64 according to an ON duty ratio corresponding to a target voltage output value, and controls to obtain the target output voltage value. The high-side drive circuit 62 and the low-side drive circuit 64 drive the transistors 68 and 70, respectively, by the ON duty ratio designated by the output control circuit 60, and control conduction and non-conduction of the transistors 68 and 70, respectively.

As the high-side transistor 68, for example, a p-channel MOSFET (Metal Oxide Semiconductor Field Effect Transistor) is used, a control voltage from the drive circuit 62 is applied to a gate terminal of the transistor 68, one end (source) of the transistor 68 is connected to the power supply voltage Vdd, and the other end (drain) of the transistor 68 is connected to an output side, as shown in FIG. 2. The high-side transistor 68 is driven by the high-side drive circuit 62, and conduction and non-conduction between the power supply voltage side and the output side are switched according to the designated ON duty ratio. As the low-side transistor 70, for example, an n-channel MOSFET is used, a control voltage from the drive circuit 64 is applied to a gate terminal of the transistor 70, one end (source) of the transistor 70 is connected to a ground potential, and the other end (drain) of the transistor 70 is connected to the output side, as shown in FIG. 2. The low-side transistor 70 is driven by the low-side drive circuit 64, and conduction and non-conduction between the ground potential side and the output side are switched according to the designated ON duty ratio. By the switching operations of the transistors 68 and 70, a signal according to the switching of conduction and non-conduction of the transistors 68 and 70 is generated on the output side.

On the output side of the transistors 68 and 70, a transformer 80 is connected through a lowpass filter 72 and a coupling capacitor 74. The lowpass filter 72 includes an inductor L and a capacitor Cf. The signal generated from the switching operations of the transistors 68 and 70 passes through the lowpass filter 72. As a result, the signal generated from the switching operations of the transistors 68 and 70 becomes an alternating current signal having a waveform corresponding to the high-voltage electrifying output voltage, and is input to the primary side of the transformer 80 in a subsequent stage. The coupling capacitor 74 provided between the lowpass filter 72 and the transformer 80 cuts off a direct current component of the transmitted alternating current signal, and a remaining alternating current component is input to the primary side of the transformer 80. The transformer 80 increases a voltage of the input alternating current signal according to a predetermined voltage transformation ratio, and outputs the alternating current signal having the increased voltage to a high-voltage output terminal 90. The transformer 80 acts as a voltage transformation unit. The high-voltage output terminal 90 is connected to the electrifying unit 30, and as a result, the electrifying unit 30 carries out electrifying.

The output control circuit 60, the drive circuits 62 and 64, the transistors 68 and 70 and the lowpass filter 72 are generally referred to as the switching circuit 92 as a circuit in a first part that generates the alternating current signal through the switching operations and outputs the generated alternating current signal to the transformer 80. The coupling capacitor 74 acts as a coupling capacitance element that is provided in a subsequent stage with respect to the switching circuit. It is noted that the switching circuit 92 in the embodiment acts as the first part of the high-voltage power supply circuit in the class D amplifier method employing a PWM (Pulse Width Modulation) method. However, instead, a pulse number modulation method, a delta sigma modulation method or such, may be employed.

As described above, in the class D amplifier method in the high-voltage power supply unit 20, regular power consumption occurs even at the time of zero output. Therefore, power supply to the drive circuits 62 and 64 is stopped during a standby time period of zero output by providing a power supply voltage control circuit 82 in the embodiment. The power supply voltage control circuit 82 is connected to a driving signal input terminal 86 and a power supply voltage input terminal 84, and opens and closes contacts between the power supply voltage Vdd supplied by the control substrate 10 and the power supply voltage Vd for the drive circuits 62 and 64 according to the class D amplifier circuit driving signal that is transmitted from the control substrate 10. The control substrate 10 generates the class amplifier circuit driving signal, and thus, controls turning on and off of the power supply voltage to the drive circuits 62 and 64.

When output of the high-voltage electrifying output voltage of a predetermined voltage output value is started from the standby state, the contacts of the power supply voltage control circuit 82 are switched, and power is supplied to the high-side drive circuit 62 and the low-side drive circuit 64. After power supply to the drive circuits 62 and 64 is thus started, the drive circuits 62 and 64 drive the transistors 68 and 70, respectively, according to an ON duty ratio corresponding to the zero output, and the transistors 68 and 70 start switching between conduction and non-conduction according to the ON duty ratio. Then, the target voltage output value is gradually increased from 0 V to a desired output value.

A voltage at a left side of the coupling capacitor 74 in FIG. 2 at the time of zero output is Vdd×α/100 according to the ON duty ratio α (%) corresponding to the zero output. That is, immediately after the power supply to the drive circuits 62 and 64 is started and zero output is started, the voltage of Vdd×α/100 is supplied to the coupling capacitor 74. Further, before the power supply voltage Vdd is supplied to the high-voltage power supply unit 20 itself, a charged electric potential of the coupling capacitor 74 is 0 V. Therefore, if no countermeasures are taken, an inrush current flows through the coupling capacitor 74, immediately after the power supply to the drive circuits 62 and 64 is started for the zero output, the first time after the power supply voltage is turned on. The inrush current flows through the coupling capacitor 74 via the transistor 68 and the inductor L of the lowpass filter 72 from the power supply voltage Vdd so that the charged electric potential of the coupling capacitor 74 becomes Vdd×α/100. The inrush current then flows into the primary side of the transformer 80, and thereby, an erroneous output of the high-voltage electrifying output voltage is generated from the secondary side of the transformer 80.

Therefore, in the embodiment, a resistance element 76 and a resistance element 78 are provided as shown in FIG. 2. Then, control is carried out such that, before power is supplied to the drive circuits 62 and 64 according to the class D amplifier circuit driving signal, the power supply voltage Vdd is divided by the resistance elements 76 and 78, and thereby, the coupling capacitor 74 is previously charged. The resistance elements 76 and 78 have resistance values $R_1$ and $R_2$, respectively. The resistance elements 76 and 78 connect the power supply voltage and the ground potential with the left side of the coupling capacitor 74, respectively. The resistance elements 76 and 78 act as a charging unit. Thus, by providing the configuration in which the coupling capacitor 74 is previously charged before output of the switching circuit 92 is started, the inrush current can be mitigated, and further, the erroneous output of the high-voltage electrifying output voltage can be avoided.

Figure 3:
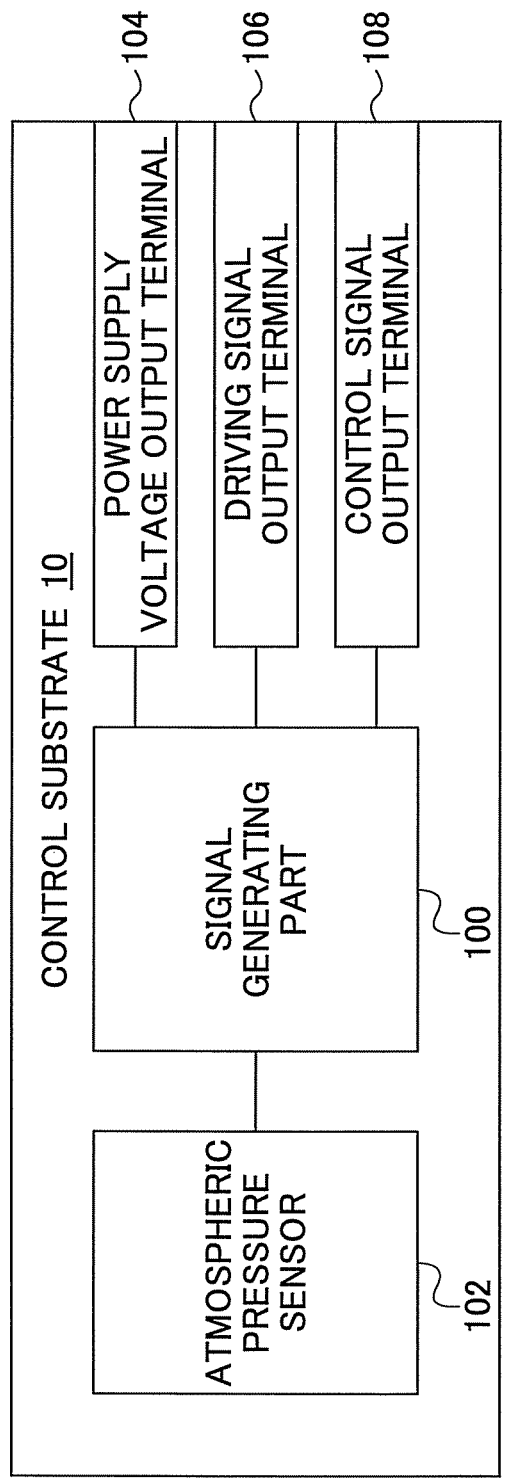
FIG. 3 shows a block diagram of a functional configuration of a control substrate in the embodiment.

Below, with reference to FIG. 3, a functional configuration of the control substrate 10 for realizing the above-described control will be described. FIG. 3 shows a block diagram showing the functional configuration of the control substrate 10 in the embodiment. As shown in FIG. 3, the control substrate 10 includes a power supply voltage output terminal 104, a driving signal output terminal 106 and a control signal output terminal 108, to which the connecting lines between the control substrate 10 and the high-voltage power supply unit 20 are connected. The control substrate 10 further includes a signal generating part 100 that generates the control signals to be output to the respective output terminals 104, 106 and 108. The signal generating part 100 acts as a control unit that controls driving of the transistors 68 and 70 in such a manner that the coupling capacitor 74 will be fully charged before the switching circuit 92 starts outputting.

The signal generating part 100 controls opening and closing of contacts (not shown) between a power supply voltage output terminal of a main power supply unit (not shown) of the laser printer and the power supply voltage output terminal 104, and controls supply of the power supply voltage to the high-voltage power supply unit 20. Further, the signal generating part 100 sets the class D amplifier circuit driving signal to an ON signal level after waiting a predetermined charging time from when supply of the power supply voltage is started through the power supply voltage output terminal 104. This operation is carried out so that power supply to the drive circuits 62 and 64 of the high-voltage power supply unit 20 is carried out after the coupling capacitance 74 is fully charged as a result of the power supply voltage being supplied thereto through the power supply voltage output terminal 104 and the power supply voltage input terminal 84. The ON signal level is a signal level to start power supply to the drive circuits 62 and 64 by closing the contacts of Vdd and Vd in the power supply voltage control circuit 82.

The charging time of the coupling capacitor 74 is a time corresponding to an RC time constant of the circuit. More specifically, the charging time of the coupling capacitor 74 is determined by respective resistance values $R_1$ and $R_2$ of the resistance elements 76 and 78 and an electrical capacitance $C_c$ of the coupling capacitor 74. A charging time for a predetermined voltage deviation [%] can be approximately calculated by the following formula (1):

$$\tau(\text{VOLTAGE DEVIATION}[\%]) = -\ln\left(\frac{\text{VOLTAGE DEVIATION}[\%]}{100}\right) \times Cc \times \frac{(R_1 + R_2)}{R_1 R_2} \quad (1)$$

In a case where the voltage deviation is 1% (i.e., 99% charging), $-\ln$ (voltage deviation/100)=4.6.

Therefore, the signal generating part 100 in the embodiment sets the class D amplifier circuit driving signal to the ON signal level after the charging time τ for reaching the predetermined voltage deviation [%] has elapsed from when starting supply of the power supply voltage Vdd to the high-voltage power supply unit 20. Thereby, it is possible to charge the coupling capacitor 74 up to within the predetermined voltage deviation [%] before power is supplied to the drive circuits 62 and 64. It is noted that in the embodiment, a state in which the coupling capacitor 74 has been charged to a given level, i.e., the voltage applied to the coupling capacitor 74 has reached within the allowable voltage deviation, is assumed to be a fully charged state.

Further, as mentioned above, the voltage of Vdd×α/100 is applied to the coupling capacitor 74 immediately after the zero output is started. Therefore, it is preferable to determine the respective resistance values $R_1$ and $R_2$ so that the charged electric potential of the coupling capacitor 74 becomes Vdd× α/100. That is, it is preferable to determine the respective resistance values $R_1$ and $R_2$ so that the equation of $R_2/(R_1+R_2)=α/100$ will hold, while the RC time constant that is allowable depending on desired performance is considered. It is noted that the ON duty ratio α is determined from the circuit constant of the output control circuit 60 shown in FIG. 2.

Further, the coupling capacitor 74 actually has a variation in the electrical capacitance $C_c$ for each particular product. Therefore, in another embodiment, the signal generating part 100 may set the class D amplifier circuit driving signal to the ON signal level after waiting an elapse of time obtained from adding a margin corresponding to tolerance of the electrical capacitance $C_c$ to the above-mentioned charging time τ. By thus providing the margin, it is possible to ensure a full charge of the coupling capacitor 74 before the switching circuit 92 starts outputting, while the variation in the electrical capacitance $C_c$ of the coupling capacitor 74 is allowed.

Further, in the electrifying unit 30 in the printer engine according to the electrophotographic method, a discharge history may remain on the photosensitive drum 40 if the erroneous output occurs having such a voltage level that discharge occurs. Thereby, serious influence may be given to image quality of the laser printer. For example, in a case where positive discharge occurs, a color band may occur on the resulting image. Conversely, in a case where negative discharge occurs, a white band may occur on the resulting image. Therefore, the erroneous output at such a level that discharge occurs cannot be allowed. However, from a reverse viewpoint, no discharge occurs unless the voltage of the erroneous output exceeds a predetermined threshold. Therefore, it can be said that the erroneous output at such a level that no discharge occurs can be allowed. Therefore, in another embodiment, inexpensive parts/components having large tolerance may be used as a result of the erroneous output being allowed at such a level that no discharge occurs.

Further, in the other embodiment, the voltage deviation corresponding to the voltage level of the erroneous output which does not cause discharge is allowed, and therefore, the charge level that is regarded as full charge is lowered within an allowable range. Thereby, a time lag occurring from the power supply voltage supply start to the driving start may be reduced, and thus a printing time can be shortened. Below, the other embodiment, in which the voltage deviation corresponding to the voltage level which does not cause discharge is allowed, will be described.

Figure 4A:
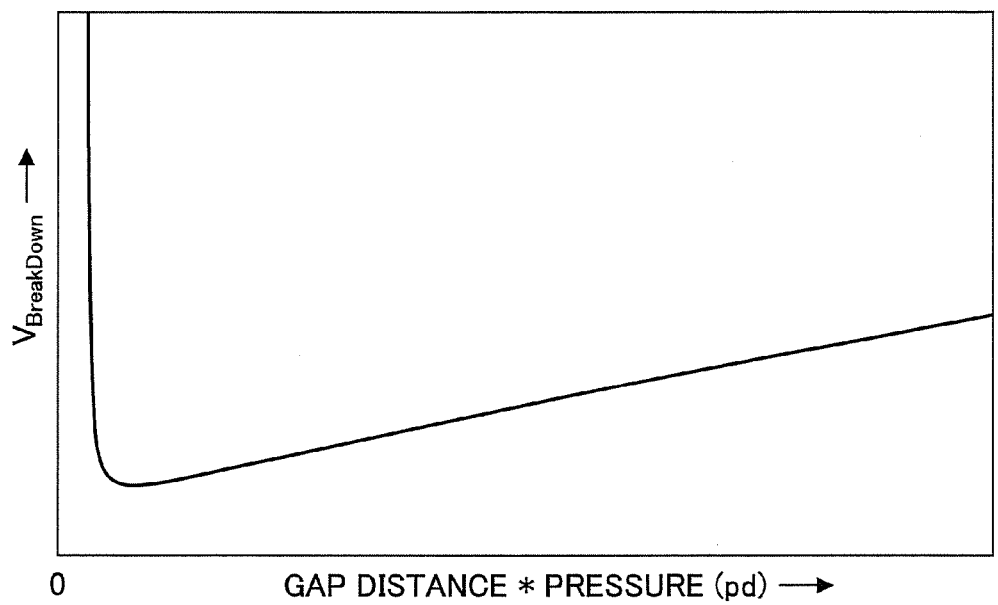
FIG. 4A shows a graph of a relationship according to a Paschen's rule between the product of an atmospheric pressure and a gap distance and a breakdown voltage.

Generally speaking, the voltage level which does not cause discharge is according to Paschen's rule, and can be expressed by a function of the distance "d" of the nip part between the electrifying unit 30 and the photosensitive drum 40 (see FIG. 1A) and the atmospheric pressure "p" in the environment in which the laser printer is disposed. A breakdown voltage $V_{BreakDown}$ according to Paschen's rule is expressed by the following formula (2). It is noted that in formula (2), B and C denote constants. FIG. 4A shows a graph showing a relationship between a product of the atmospheric pressure "p" and the gap distance "d", and the breakdown voltage, according to Paschen's rule. It is possible to obtain, as shown in FIG. 4A, the breakdown voltage $V_{BreakDown}$ with respect to the product of the atmospheric pressure "p" and the gap distance "d".

$$V_{BreakDown}(pd) = \frac{B(pd)}{\ln(pd) + C} \quad (2)$$

Figure 4B:
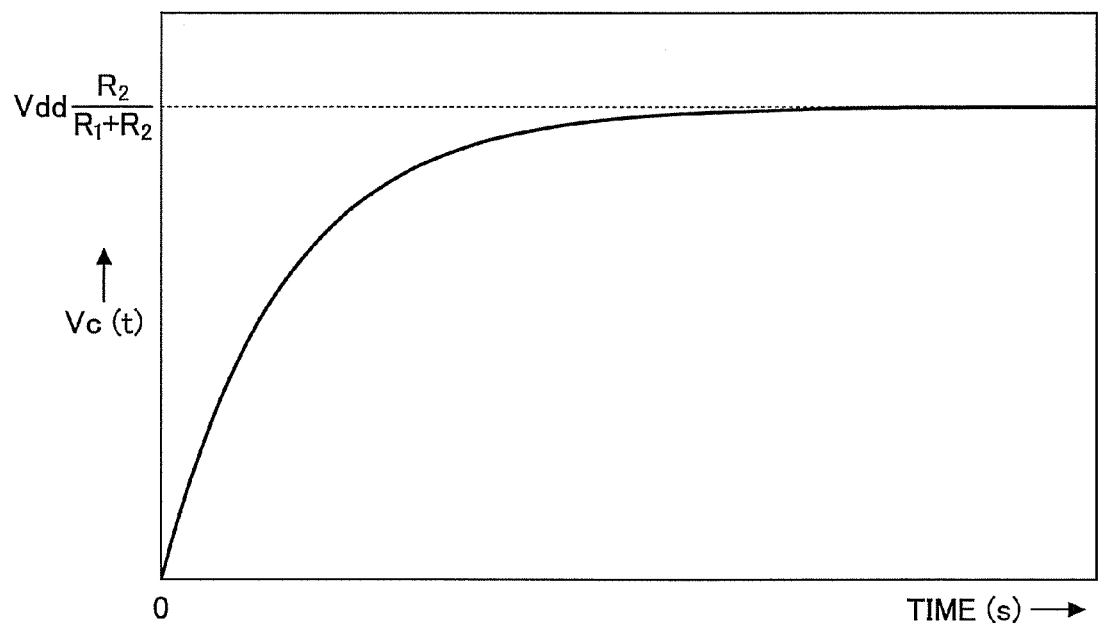
FIG. 4B shows a graph of a variation of a voltage applied to a coupling capacitor from a start of charging.

Further, a voltage Vc(t) of the coupling capacitor 74 after t seconds from the start of discharging can be expressed by the following formula (3). FIG. 4B shows a graph of showing a variation of the voltage Vc(t) from the start of discharging. As shown in FIG. 4B, the voltage Vc(t) varies to converge with $Vdd \times R_2/(R_1+R_2)$ according to a time constant.

$$Vc(t) = Vdd \times \frac{R_2}{R_1 + R_2} \times \left(1 - \exp\left(\frac{-t}{Cc\left(\frac{R_1+R_2}{R_1 R_2}\right)}\right)\right) \quad (3)$$

It is assumed that the voltage transformation ratio of the transformer 80 is 1:m. Then, the magnitude of the erroneous output occurring in a case where the contacts in the power supply voltage control circuit 82 are closed after t seconds is as follows. That is, approximately after t seconds, the magnitude of the erroneous output becomes one obtained from multiplying a voltage difference between Vc(t) and Vdd×α/100 applied to the coupling capacitor 74 at the time of zero output by the voltage transformation ratio. Thus, the magnitude of the erroneous output occurring approximately after t seconds is expressed by (Vdd×α/100−Vc(t))×m. Therefore, in the other embodiment, a time τ such that the inequality of (Vdd×α/100−Vc(τ))×m<$V_{BreakDown}$ holds is calculated, and the class D amplifier circuit driving signal is set to the ON signal level after the calculated time τ has elapsed. The time τ that meets the condition corresponds to the charging time τ corresponding to the voltage deviation at which the erroneous output becomes $V_{BreakDown}$. Thereby, before power is supplied to the drive circuits 62 and 64, charging of the coupling capacitor 74 for the charged voltage within the voltage deviation corresponding to the breakdown voltage can be ensured. Thus, it is possible to reduce a printing time, and also, to avoid degradation in image quality. It is noted that the above-mentioned time τ may include a margin in consideration of tolerance of parts/components.

Further, the above-mentioned time τ may be calculated by the CPU 12 of the control substrate 10 (see FIG. 1A). In this case, it is possible to reduce a calculating load of the CPU 12 by previously obtaining the time τ during a designing stage and storing the obtained time τ in a memory such as the ROM 14. Further, according to Paschen's rule, the breakdown voltage $V_{BreakDown}$ depends on the atmospheric pressure "p" (see FIG. 4A). Therefore, as shown in FIG. 3, an atmospheric pressure sensor 102 may be provided in the control substrate 10, the breakdown voltage $V_{BreakDown}$(p) may be calculated according to a measured atmospheric pressure value of the atmospheric pressure sensor 102, and the time τ such that the inequality of (Vdd×α/100−Vc(τ))×m<$V_{BreakDown}$(p) holds may be calculated. In the other embodiment, the optimum charging time corresponding to the atmospheric pressure is thus calculated, and driving of the class D amplifier circuit can be started at the optimum time at which discharge does not occur, corresponding to the place and the atmospheric pressure at which the laser printer is disposed. Therefore, it is possible to achieve the operation that is suitable to the environment from the viewpoint of image quality and printing time.

Figure 5:
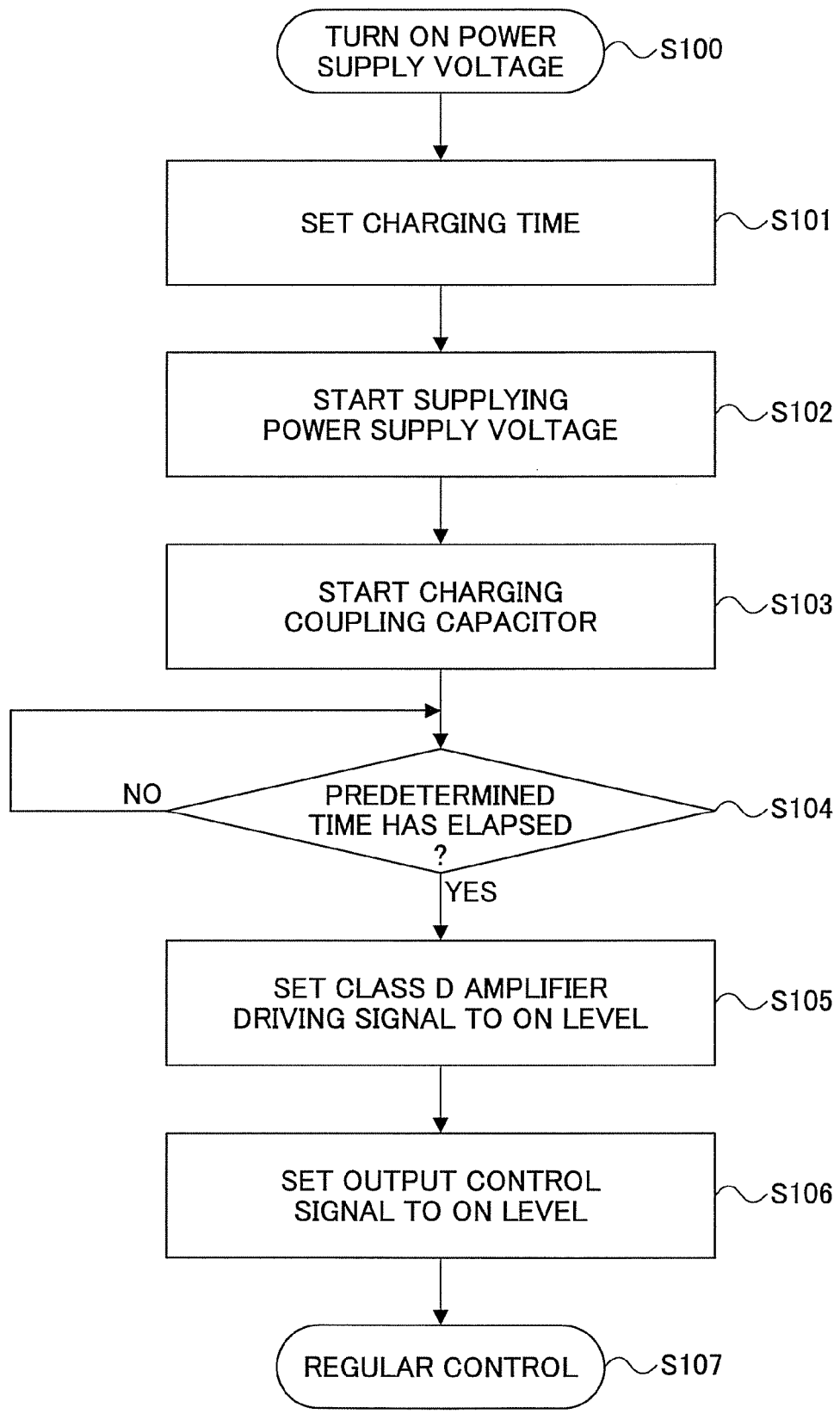
FIG. 5 shows a flowchart of a high-voltage power supply control flow carried out in the control substrate and the high-voltage power supply unit in the embodiment.

FIG. 5 is a flowchart showing a high-voltage power supply control flow carried out in the control substrate 10 and the high-voltage power supply unit 20. The control shown in FIG. 5 starts from step S100 in which power supply is started in the laser printer and thus in the power supply unit 50 (see FIG. 1A). Then, in step S101, the signal generating part 100 in the control substrate 10 obtains the value of the charging time τ, and sets the obtained charging time at a timer that the signal generating part 100 has (not shown). Then, in step S102, the signal generating part 100 starts supply of the power supply voltage to the high-voltage power supply unit 20. The charging time τ may be obtained as a result of the CPU 12 calculating, or may be obtained as a result of the CPU 12 reading from the ROM 14.

In response to the power supply voltage Vdd being thus supplied to the high-voltage power supply unit 20 in step S102, charging of the coupling capacitor 74 is started by using the resistance elements 76 and 78 in the high-voltage power supply unit 20 in step S103. In step S104, the signal generating part 100 of the control substrate 10 waits for the time that has been set in step S101 elapsing (NO in step S104). When determining that the set time has elapsed (YES in step S104), the signal generating part 100 sets the class D amplifier circuit driving signal to the ON signal level in step S105. In the high-voltage power supply unit 20, in response to the class D amplifier circuit driving signal being thus set to the ON signal level, the contacts in the power supply voltage control circuit 82 are closed, and power is supplied to the drive circuits 62 and 64 through the power supply voltage control circuit 82.

Then, in step S106, the signal generating part 100 sets the output value control signal (see FIG. 1A) to the ON signal level. In response thereto, the output control circuit 60 of the high-voltage power supply unit 20 (see FIG. 2) starts driving the drive circuits 62 and 64 at the ON duty ratio corresponding to the zero output. Then, in step S107, the high-voltage power supply unit 20 enters a mode of regular control in which the target voltage output value is gradually increased to the desired high-voltage output level from the level of the zero output.

In the above-described embodiments, in the high-voltage power supply circuit (of the high-voltage power supply unit 20) according to the class D amplifier method, the coupling capacitor 74 is previously charged by the voltage obtained from the power supply voltage Vdd being divided by the resistance elements 76 and 78 before power supply is started to the drive circuits 62 and 64 that drive the transistors 78 and 70. Thus, by the configuration in which the coupling capacitor 74 is fully charged or so before the switching circuit 92 starts outputting, the inrush current to the primary side of the transformer 80 can be mitigated, the erroneous output of the high-voltage electrifying output voltage can be mitigated, and further, degradation in image quality caused by the erroneous output can be suitably avoided.

Further, timing at which power supply to the drive circuits 62 and 64 is started is determined in consideration of such a charged level of the coupling capacitor 74 not to cause image quality degradation. Therefore, it is possible to minimize degradation in printing performance of the printer engine. Especially, by allowing the erroneous output less than the breakdown voltage at which no discharge occurs in the electrifying unit 30, it is possible to reduce a printing time without degrading image quality.

It is noted that, in the above-described embodiments, the class D amplifier circuit driving signal is set to the ON signal level after the predetermined time τ measured by the timer has elapsed. However, a configuration may be provided in which, in a case of being allowed in consideration of the costs, the voltage drop between both ends of the coupling capacitor 74 is measured at sufficient accuracy, and, in response to the measured voltage drop between both ends of the coupling capacitor 74 becoming the predetermined voltage level corresponding to the above-mentioned allowable voltage deviation as a trigger, the class D amplifier circuit driving signal is set to the ON signal level.

As described above, according to the embodiments, it is possible to provide the power supply unit, the image forming apparatus including the power supply unit and the power supply control method realized in the power supply unit by which, while performance of the image forming process is maintained, the erroneous output of the high-voltage power supply according to the class D amplifier method can be mitigated, and degradation in image quality in the image forming process employing the electrifying unit according to the electrophotographic method or such can be suitably mitigated.

The present invention is not limited to the specifically disclosed embodiments, and variations and modifications may be made without departing from the scope of the present invention.

The present application is based on Japanese Priority Application No. 2009-279408, filed Dec. 9, 2009, the entire contents of which are hereby incorporated herein by reference.

What is claimed is:

1. A power supply unit comprising:
a switching circuit that drives a switching device at a duty ratio corresponding to a target voltage output value and outputs an alternating current signal;
a coupling capacitance element provided in a subsequent stage with respect to the switching circuit;
a voltage transformation unit that increases a voltage of the alternating current signal input by using the switching circuit, and outputs, a high-voltage alternating current voltage to an electrifying unit;
a charging unit that charges the coupling capacitance element in response to a power supply voltage being turned on; and
a control unit that controls the switching device to cause the coupling capacitance element to be charged to a predetermined charged amount before the switching circuit starts outputting the alternating current signal.

2. The power supply unit as claimed in claim 1, wherein the control unit sets, to an ON signal level, a driving signal that controls driving of the switching circuit after a time corresponding to a time constant that is obtained from an electrical capacitance of the coupling capacitance element and resistance values of resistance elements included in the charting unit has elapsed from when charging of the coupling capacitance element is started in response to the power supply voltage being turned on.

3. The power supply unit as claimed in claim 2, wherein the time corresponding to the time constant is a charging time required for a voltage applied to the coupling capacitance element reaching within an allowable voltage deviation range, or a time obtained from a margin corresponding to a tolerance of the electrical capacitance of the coupling capacitance element being added to the charging time.

4. The power supply unit as claimed in claim 2, wherein the control unit obtains the time corresponding to the time constant in which a magnitude of an erroneous output depending on a charged state of the coupling capacitance element becomes equal to or less than a breakdown voltage according to Paschen's rule.

5. The power supply unit as claimed in claim 2, further comprising an atmospheric pressure sensor, wherein the control unit obtains the time corresponding to the time constant in which a magnitude of an erroneous output depending on a charged state of the coupling capacitance element becomes equal to or less than a breakdown voltage corresponding to an atmospheric pressure sensor according to Paschen's rule.

6. The power supply unit as claimed in claim 1, wherein the coupling capacitance element is charged by a voltage obtained from the power supply voltage being divided according to resistance values of resistance elements included in the charging unit.

7. The power supply unit as claimed in claim 1, wherein resistance values of resistance elements included in the charging unit are a combination of resistance values corresponding to a duty ratio in a case where the target voltage output value is zero, and the resistance values of the resistance elements and an electrical capacitance of the coupling capacitance element have values corresponding to a time from the power supply voltage being turned on to the driving of the switching device being started.

8. The power supply unit as claimed in claim 2, wherein the time corresponding to the time constant is previously calculated and stored in a storage device.

9. The power supply unit as claimed in claim 1, wherein the charging unit includes a first resistance element connected between a terminal of the power supply voltage and one end of the coupling capacitance element, and a second resistance element connected between the end of the coupling capacitance element and a ground point.

10. An image forming apparatus, comprising:
the power supply unit claimed in claim 1; and
the electrifying unit that receives the high-voltage alternating current voltage that is output by the power supply unit, and electrifies a photosensitive member, the photosensitive member being then exposed by signal light and an electrostatic latent image being formed on the photosensitive member.

11. A power supply control method, carried out by a power supply unit that includes a switching circuit, a coupling capacitance element provided in a subsequent stage with respect to the switching circuit, a voltage transformation unit to which an alternating current signal is input by the switching circuit, a charging unit connected to the coupling capacitance element, and a control unit, the power supply control method comprising the steps of:

the charging unit charging the coupling capacitance element in response to a power supply voltage being turned on;

the control unit controlling the switching circuit to cause the coupling capacitance element to be charged to a predetermined charged amount before the switching circuit starts outputting the alternating current signal;

the switching circuit driving a switching device at a duty ratio corresponding to a target voltage output value and outputting the alternating current signal; and the voltage transformation unit increasing the alternating current signal that is input by using the coupling capacitance element, and outputting a high-voltage alternating current voltage to an electrifying unit.

12. The power supply control method as claimed in claim 11, wherein in the step of the control unit controlling the switching circuit, the control unit sets, to an ON signal level, a driving signal that controls driving of the switching circuit after a time corresponding to a time constant that is obtained from an electrical capacitance of the coupling capacitance element and resistance values of resistance elements included in the charging unit has elapsed from when charging of the coupling capacitance element is started in response to the power supply voltage being turned on.

13. The power supply control method as claimed in claim 11, wherein in the step of the control unit controlling the switching circuit, the control unit obtains the time corresponding to the time constant in which a magnitude of an erroneous output depending on a charged state of the coupling capacitance element becomes equal to or less than a breakdown voltage according to Paschen's rule.

* * * * *